United States Patent
Hsu

(10) Patent No.: US 6,591,740 B1
(45) Date of Patent: Jul. 15, 2003

(54) BARBECUE GRILL WITH AN ADJUSTING DEVICE

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/310,897

(22) Filed: Dec. 6, 2002

(51) Int. Cl.[7] .......................... A47J 37/00; A47J 37/06; A47J 37/08
(52) U.S. Cl. .............................. 99/349; 99/353; 99/372; 99/375; 99/378; 99/379; 99/449; 99/450
(58) Field of Search .................... 99/331, 337, 338, 99/339, 340, 349, 352–355, 372–384, 400, 401, 422–425, 444–450, 481, 482; 126/25 R, 9 R, 9 B, 25 A, 41 R; 219/521, 524, 525, 492, 494; 426/523, 520, 512

(56) References Cited

U.S. PATENT DOCUMENTS

| | | | |
|---|---|---|---|
| 3,880,064 A | * 4/1975 | Martinex | 99/349 |
| 4,972,766 A | * 11/1990 | Anetsberger | 99/332 |
| 5,473,976 A | * 12/1995 | Hermansson | 99/349 |
| 5,531,155 A | * 7/1996 | Pellicane et al. | 99/372 |
| 5,555,794 A | * 9/1996 | Templeton et al. | 99/349 |
| 5,655,434 A | * 8/1997 | Liebemann | 99/353 |
| 5,676,046 A | * 10/1997 | Taber et al. | 99/340 |
| 5,755,150 A | * 5/1998 | Matsumoto et al. | 99/372 |
| 5,771,782 A | * 6/1998 | Taber et al. | 99/385 X |
| 5,802,958 A | * 9/1998 | Hermansson | 99/379 X |
| 5,839,359 A | * 11/1998 | Gardener | 99/349 |
| 5,881,634 A | * 3/1999 | Newton | 99/379 X |
| 5,890,419 A | * 4/1999 | Moravec | 99/349 |

* cited by examiner

Primary Examiner—Timothy F. Simone
(74) Attorney, Agent, or Firm—Rosenberg, Klein & Lee

(57) ABSTRACT

A barbecue grill with an adjustment device comprises a cover, a rack, a post, a tooth plate, an adjusting gear, a spring, a knob, a bolt and a nut, wherein the tooth plate has teeth along one inner side, and the knob comprises a threaded hole, the adjusting gear meshes with the teeth of the tooth plate, the bolt is inserted through the knob, the spring, the adjusting gear, the cover, and: is tightened by the nut from the other end. This secures the tooth plate to the cover while the post of the rack is placed in the tooth plate. When the knob is turned to loosen the adjusting gear, the adjusting gear is able to adjust with respect to the teeth of the tooth plate and the gap between the cover and the rack is adjustable.

3 Claims, 5 Drawing Sheets

BARBECUE GRILL WITH AN ADJUSTING DEVICE

FIELD OF THE INVENTION

This invention relates to a barbecue grill, and more particularly, to a rack with an adjusting device to adjust the distance between the cover and the rack of the barbecue grill.

BACKGROUND OF THE INVENTION

A conventional barbecue grill comprises a cover and a rack with the rear sides pivoted together, so that a user may open and close the cover from the front end. This design leaves a gap when the cover is closed, so as to place food inside. If the sliced beef to be baked is too thick, the cover needs to be opened so that the food may seat on the rack and bake properly. This takes more time to prepare food and also wastes energy. Another design is derived to improve this shortcoming, which uses a swivel design to connect the cover and the rack, thus both the cover and the rack may be placed flat to bake food at same time. This still has energy loss. A detachable design was later derived so that a user may take apart the cover and the rack and place the cover on the food seating on the rack. This design is hard to control the time and temperature and causes outside of the food over burnt while inside of the food is still raw.

In view of these and many other shortcomings, the inventor has invented the present invention for improvement.

SUMMARY OF THE INVENTION

It is the primary object of the present invention to provide a barbecue grill with an adjusting device, which a gap between the cover and the rack is adjustable so as to accommodate food with different thickness.

It is another object of the present invention to provide a barbecue grill with an adjusting device, which is easy to operate.

It is a further object of the present invention to provide a barbecue grill with an adjusting device, which saves energy and is cost effectiveness.

DETAILED DESCRIPTION OF THE PREFERRED EMBODIMENT

Figure 1:
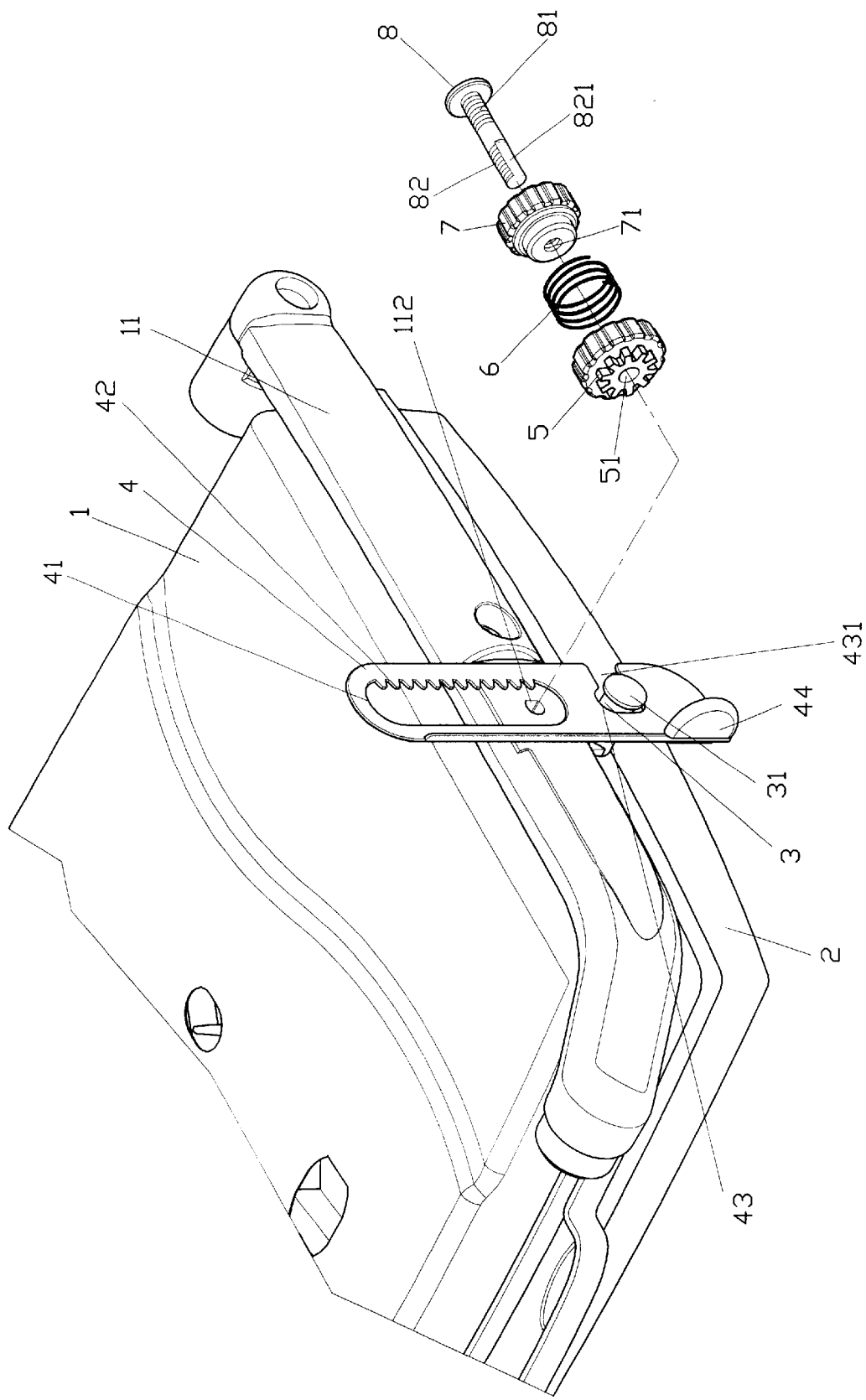
FIG. 1 is an exploded view of the present invention.
Figure 2:
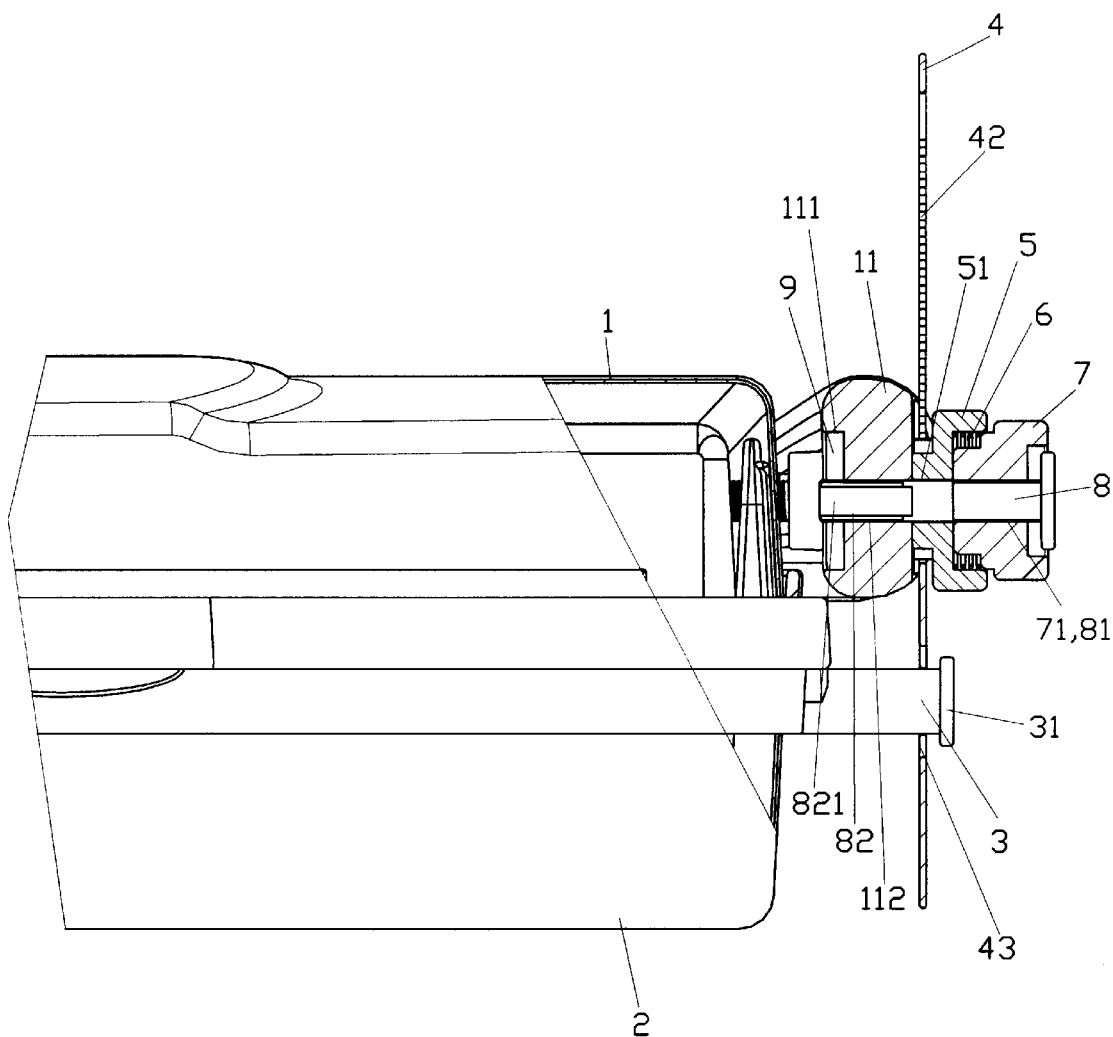
FIG. 2 is a view showing the assembly of the present invention, partially sectioned.

As shown in FIGS. 1 and 2, the present invention comprises a cover 1, a rack 2, a post 3, a tooth plate 4, an adjusting gear 5, a spring 6, a knob 7, a bolt 8 and a nut 9.

The cover 1 has a handle 11 at one side with a recess 111 inside. The recess 111 has a through hole 112 therein.

The rack 2 comprises the post 3 at one side corresponding to the through hole 112 of the handle 11 of the cover 1.

The post 3 has an enlarged section 31 at one end.

The tooth plate 4 has a long slot 41 and a short slot 43. The long slot 41 comprises teeth 42 on one inner side and is able to accommodate the adjusting gear 5 therein. The short slot 43 is to accommodate the post 3 therein and comprises a notch 431 for the post 3 to insert there through. The tooth plate 4 further comprises a trigger 44.

The adjusting gear 5 comprises a hole 51 therein.

The spring 6 is placed between the adjusting gear 5 and the knob 7.

The knob 7 comprises a threaded hole 71.

The bolt 8 comprises a first threaded section 81 a second threaded section 82. The second threaded section 82 has a flat section 821. The first threaded section 81 is threaded with the threaded hole 71 of the knob 7.

To assemble the present invention, the nut 9 is inserted into the recess 111 of the cover 1. The adjusting gear 5 meshes with the teeth 42 of the tooth plate 4. The bolt 8 is inserted through the threaded hole 71 of the knob 7, the spring 6, the hole 51 of the adjusting gear 5 and the hole 112 of the cover 1, and is secured with the nut 9 to its second threaded section 82. Due to the flat section 821 of the second threaded section 82, the nut 9 grabs the bolt 8 securely. The knob 7 engages with the adjusting gear 5, which then presses the tooth plate 4 against the handle 11 of the cover 1 securely. The post 3 at the rack 2 is inserted into the short slot 43 of the tooth plate 4. The weight of the cover 1 forces the upper edge of the short slot 43 of the tooth plate 4 to engage with the post 3, and the enlarged section 31 of the post 3 prevents the tooth plate 4 from disengaging.

Figure 3:
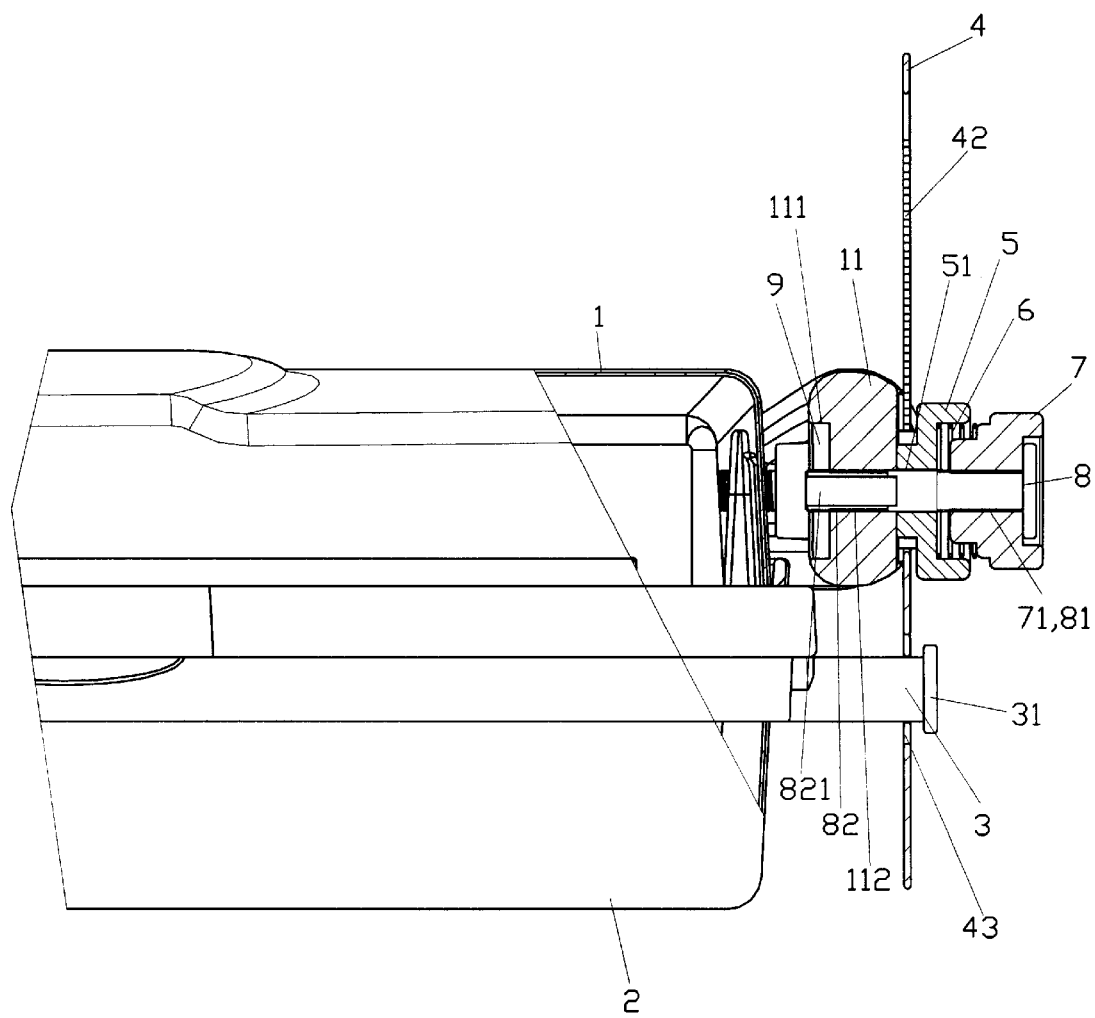
FIG. 3 is a view illustrating the embodiment the present invention (The knob is loosened.)
Figure 4:
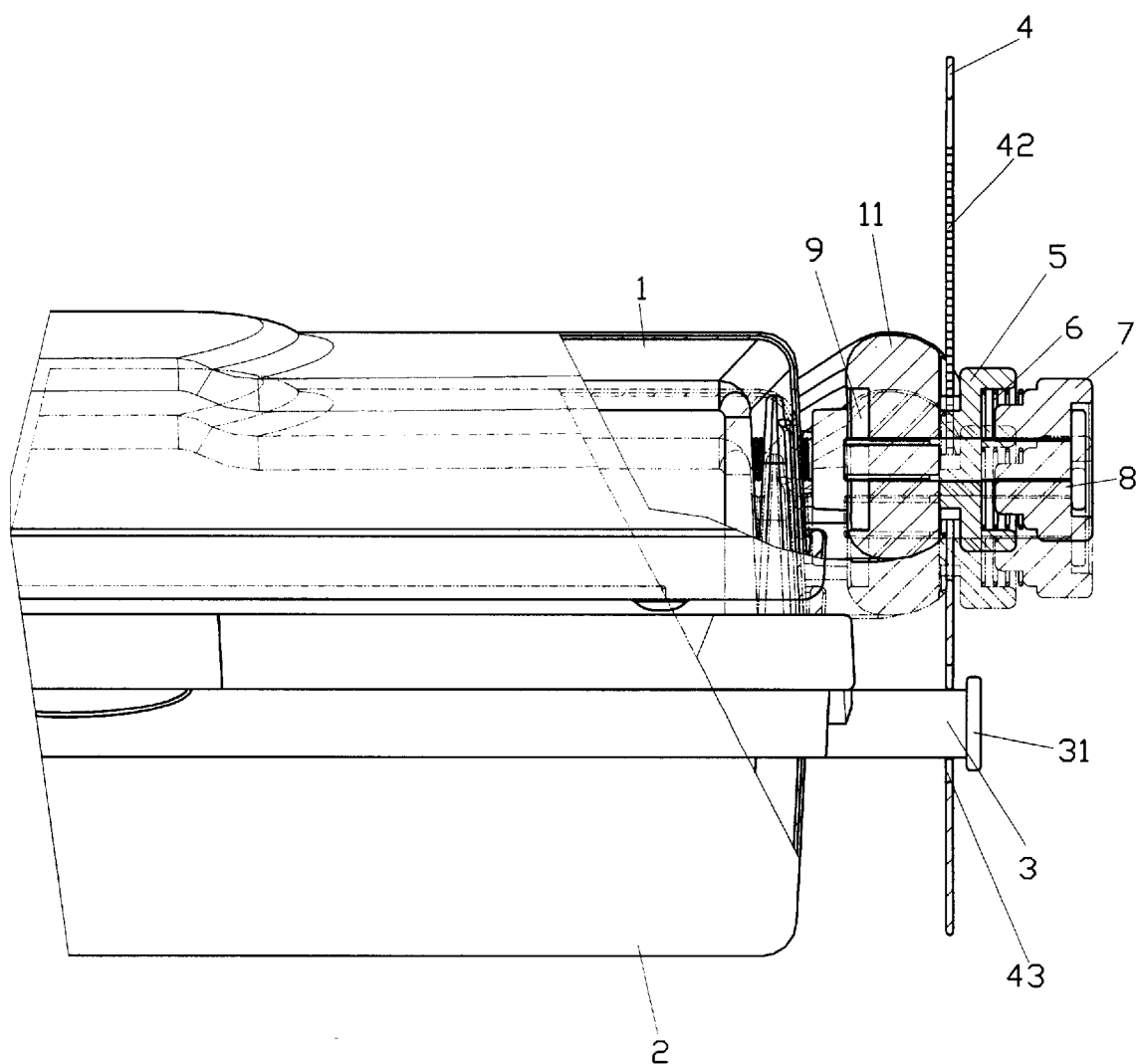
FIG. 4 is a view illustrating the embodiment the present invention (The adjusting gear is turned)

When the knob 7 is loosened, as shown in FIG. 3, the knob 7 will no longer apply force against the adjusting gear 5 and the bolt 8 will not detach from the nut 9 due to the flat section 821 of the second threaded section 82. Further, the spring 6 still provides force against the adjusting gear 5 to mesh with the tooth plate 4, thus by adjusting the adjusting gear 5 with respect to the teeth 42 of the tooth plate 4, as shown in FIG. 4, the gap between the cover 1 and the rack 2 is adjustable. Upon completion of adjustment, the knob 7 is tightened to engage with the adjusting gear 5 securely to force the adjusting gear 5 engaging with the handle 11 of the cover 1.

Figure 5:
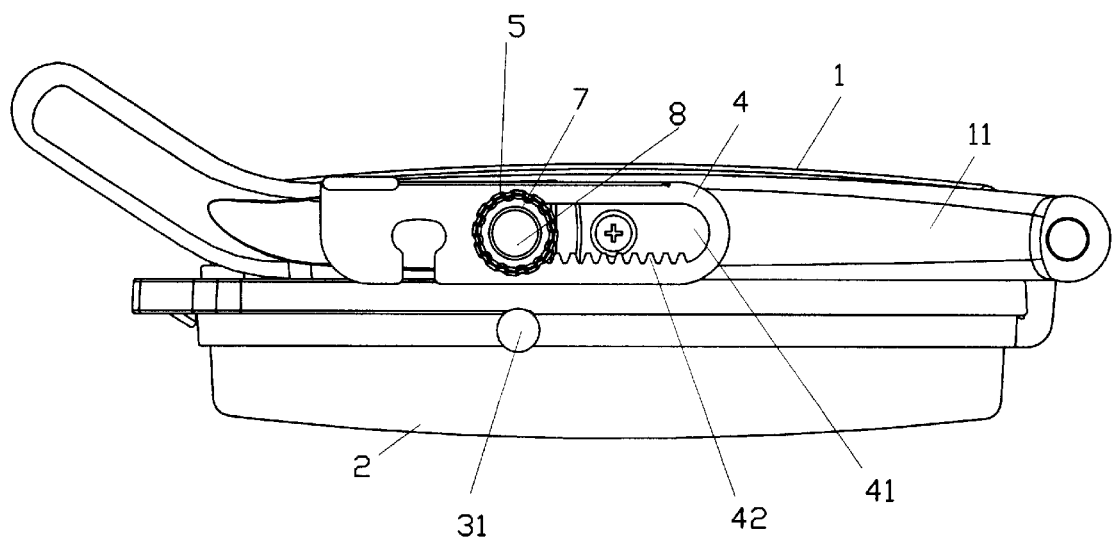
FIG. 5 is a side view illustrating the embodiment the present invention (The tooth plate is in a stored status).

As shown in FIG. 5, when the barbecue grill is not in use, the knob 7 is loosened to move the tooth plate 4. By pressing the trigger 44, the notch 431 of the tooth plate 4 is detached from the post 3, thus the barbecue grill is ready for storage.

With respect to the above-mentioned invention, the spring 6 may be taken away. When the knob 7 is loosened to disengage from; the adjusting gear 5, the adjusting gear 5 still meshes with the teeth 42 of the tooth plate 4 to turn. It is still under the scope of this invention without the spring 6 in the rack.

I claim:

1. A barbecue grill with an adjusting device comprising a cover, a rack, a post, a tooth plate, an adjusting gear, a knob, a bolt and a nut, wherein said cover comprising a handle at one side with a recess therein, said recess having a through hole therein;

said rack comprising said post at one side corresponding to said through hole of said cover;

said tooth plate comprising a long slot and a short slot, said long slot comprising teeth on one inner side and said short slot comprising a notch;

said adjusting gear comprising an inner hole;

said knob comprising a threaded hole;

said bolt comprising a first threaded section and a second threaded section, said first threaded section being threaded with said threaded hole of said knob, said nut being placed within said recess of said cover, and said adjusting gear meshing with said teeth of said tooth plate, said bolt being inserted through said threaded hole of said knob, said inner hole of said adjusting gear, said through hole of said cover, and secured by said nut with said second threaded section, while said first threaded section being threaded with said threaded hole of said knob, thus said knob tightening said adjusting gear and forcing said adjusting gear to engage with said handle of said cover, said tooth plate being secured to said cover, while said post of said rack engaging with said short slot of said tooth plate, by loosening said knob, said tooth plate being released and said adjusting gear being able to turn with respect to said teeth of said tooth plate to adjust a gap between said cover and said rack.

2. The barbecue grill with an adjusting device, as recited in claim 1, wherein a spring is provided between said knob and said adjusting gear, said spring forces said adjusting gear to mesh with said teeth of said tooth plate when said knob is loosened.

3. The barbecue grill with an adjusting device, as recited in claim 1, wherein said second threaded section of said bolt comprises a flat section.

* * * * *